US011201745B2

(12) United States Patent
Barham et al.

(10) Patent No.: US 11,201,745 B2
(45) Date of Patent: Dec. 14, 2021

(54) METHOD AND SYSTEM FOR PRIVACY PRESERVING BIOMETRIC AUTHENTICATION

(71) Applicant: International Business Machines Corporation, Armonk, NY (US)

(72) Inventors: Muhammad Barham, Haifa (IL); Ariel Farkash, Shinshit (IL); Ron Shmelkin, Haifa (IL); Omri Soceanu, Haifa (IL); Michael Vinov, Nofit (IL)

(73) Assignee: International Business Machines Corporation, Armonk, NY (US)

( * ) Notice: Subject to any disclaimer, the term of this patent is extended or adjusted under 35 U.S.C. 154(b) by 442 days.

(21) Appl. No.: 16/244,138

(22) Filed: Jan. 10, 2019

(65) Prior Publication Data

US 2020/0228339 A1 Jul. 16, 2020

(51) Int. Cl.
*H04L 29/06* (2006.01)
*H04L 9/32* (2006.01)
(Continued)

(52) U.S. Cl.
CPC ............ *H04L 9/3231* (2013.01); *G06N 3/08* (2013.01); *G06N 7/005* (2013.01); *H04L 9/008* (2013.01); *H04L 9/0869* (2013.01); *H04L 9/3221* (2013.01)

(58) Field of Classification Search
CPC ..... H04L 9/3231; H04L 9/008; H04L 9/0869; H04L 9/3221; G06N 20/00; G06N 3/08; G06N 7/005; G06F 21/32
See application file for complete search history.

(56) References Cited

U.S. PATENT DOCUMENTS 6,317,834 B1   11/2001  Gennaro et al.
7,783,893 B2    8/2010  Gorelik et al.
(Continued)

FOREIGN PATENT DOCUMENTS

CA      2658846 C      3/2015
CN    105631296   *    6/2016
(Continued)

OTHER PUBLICATIONS

Notification of Transmittal of the International Search Report and the Written Opinion of the International Searching Authority, International Search Report, and Written Opinion of the International Searching Authority, dated Apr. 17, 2020, in PCT/IB2019/060749.
(Continued)

*Primary Examiner* — Hosuk Song
(74) *Attorney, Agent, or Firm* — Gregory J Kirsch

(57) ABSTRACT

Embodiments of the present systems and methods may provide encrypted biometric information that can be stored and used for authentication with undegraded recognition performance. For example, in an embodiment, a method may comprise storing a plurality of encrypted trained weights of a neural network classifier, wherein the weights have been trained using biometric information representing at least one biometric feature of a person, receiving encrypted biometric information obtained by sampling at least one biometric feature of the person and encrypting the sampled biometric feature, obtaining an match-score using the encrypted trained neural network classifier, the match-score indicating a probability that the received encrypted biometric information matches the stored encrypted biometric information, and authenticating the person when the probability that received encrypted biometric information matches the stored encrypted biometric information exceeds a threshold.

18 Claims, 4 Drawing Sheets

(51) Int. Cl.
*H04L 9/00* (2006.01)
*G06N 7/00* (2006.01)
*H04L 9/08* (2006.01)
*G06N 3/08* (2006.01)

(56) References Cited

U.S. PATENT DOCUMENTS

| | | | |
|---|---|---|---|
| 8,046,588 B2* | 10/2011 | Gibart | G06F 21/32 |
| | | | 713/186 |
| 8,784,197 B2* | 7/2014 | Alderucci | G07F 17/3206 |
| | | | 463/29 |
| 9,613,292 B1 | 4/2017 | El Defrawy et al. | |
| 9,853,976 B2* | 12/2017 | Zizi | H04L 9/06 |
| 10,181,952 B2* | 1/2019 | Schwach | H04L 9/0866 |
| 10,210,381 B1* | 2/2019 | Mostafa | G06F 21/32 |
| 10,255,040 B2* | 4/2019 | Streit | G06F 21/32 |
| 2012/0016827 A1 | 1/2012 | Evans et al. | |
| 2013/0148868 A1 | 6/2013 | Troncoso Pastoriza et al. | |
| 2016/0269178 A1 | 9/2016 | Yang et al. | |
| 2018/0176216 A1 | 6/2018 | Mather et al. | |

FOREIGN PATENT DOCUMENTS

| | | |
|---|---|---|
| CN | 105631296 A | 6/2016 |
| CN | 108540457 A | 9/2018 |
| CN | 108681698 A | 10/2018 |
| EP | 2187338 | 5/2010 |
| KR | 20180066610 A | 6/2018 |

OTHER PUBLICATIONS

Nandakumar, Karthik et al., Biometric template protection: Bridging the performance gap between theory and practice, IEEE Signal Processing Magazine 32.5 (2015): 88-100.

* cited by examiner

METHOD AND SYSTEM FOR PRIVACY PRESERVING BIOMETRIC AUTHENTICATION

BACKGROUND

The present invention relates to techniques that provide encrypted biometric information that can be stored and used for authentication with undegraded recognition performance.

Unlike deterministic passwords, biometric features are constantly changing due to factors such as changes in the acquisition process (sampling noise, shadows, position changes, etc.) or natural reasons (injury, beard, old age, etc.). Therefore, as opposed to passwords, biometric information will not be an exact match each time it is sampled, thus cannot be handled like a passwords, such as stored, salted, and hashed. Currently there is no practical method to encrypt biometric information and maintain its utility for authentication. For example, a reason for this unavailability is the unacceptable degradation in recognition performance combined with unprovable security claims. Consequently, biometric information is currently stored in various databases, which are vulnerable to attacks.

Accordingly, a need arises for techniques that may provide encrypted biometric information that can be stored and used for authentication with undegraded recognition performance.

SUMMARY

Embodiments of the present systems and methods may provide encrypted biometric information that can be stored and used for authentication with undegraded recognition performance. Embodiments may provide advantages over current techniques. For example, embodiments may provide security claims that can be measured against current cryptographic solutions, such as symmetric and asymmetric methods, since embodiments may be include known and accepted cryptographic modules. Further, the degradation in recognition performance rates can be described as a trade-off with memory and speed requirements, and for industry acceptable performance requirements embodiments may achieve both.

For example, in an embodiment, a method for biometric authentication, implemented in a computer comprising a processor, memory accessible by the processor, and computer program instructions stored in the memory and executable by the processor, may comprise storing a plurality of encrypted trained weights of a neural network classifier, wherein the weights have been trained using biometric information representing at least one biometric feature of a person, receiving encrypted biometric information obtained by sampling at least one biometric feature of the person and encrypting the sampled biometric feature, obtaining an match-score using the encrypted trained neural network classifier, the match-score indicating a probability that the received encrypted biometric information matches the stored encrypted biometric information, and authenticating the person when the probability that received encrypted biometric information matches the stored encrypted biometric information exceeds a threshold.

In embodiments, the trained weights may be encrypted using homomorphic encryption, multi-party computation, or a combination of the two. Obtaining the match-score may comprise obtaining an encrypted match-score using the encrypted trained neural network classifier, transmitting the encrypted match-score to a client device, receiving an unencrypted match-score from the client device, determining that the client correctly decrypted the match-score using a zero-knowledge proof, and comparing the unencrypted match-score with the threshold. Obtaining the match-score may comprise obtaining an encrypted match-score using the encrypted trained neural network classifier, multiplying the encrypted match-score by a first encrypted secret integer, encrypting a plurality of additional secret integers, transmitting the multiplied encrypted match-score and at least some of the plurality of encrypted additional secret integers to a client device, receiving a decrypted multiplied match-score and decrypted additional secret integers from the client device, verifying the correctness of the decrypted additional secret integers, and dividing the unencrypted match-score by the first encrypted secret integer to obtain the match-score. The multiplied encrypted match-score the encrypted additional secret integers may be transmitted to the client device in a secret random order. The encrypted biometric information may be received from a client device communicatively connected to a biometric information acquisition device. The decryption may be performed at the client device using a private key. Some of the layers of the neural network classifier may be trained using publicly-available non-private biometric information, and some layers of the neural network classifier may be re-trained using private biometric information of the person.

In an embodiment, a system for biometric authentication may comprise a processor, memory accessible by the processor, and computer program instructions stored in the memory and executable by the processor to perform: storing a plurality of encrypted trained weights of a neural network classifier, wherein the weights have been trained using biometric information representing at least one biometric feature of a person, receiving encrypted biometric information obtained by sampling at least one biometric feature of the person and encrypting the sampled biometric feature, obtaining an match-score using the encrypted trained neural network classifier, the match-score indicating a probability that the received encrypted biometric information matches the stored encrypted biometric information, and authenticating the person when the probability that received encrypted biometric information matches the stored encrypted biometric information exceeds a threshold.

In an embodiment, a computer program product for biometric authentication may comprise a non-transitory computer readable storage having program instructions embodied therewith, the program instructions executable by a computer, to cause the computer to perform a method comprising: storing a plurality of encrypted trained weights of a neural network classifier, wherein the weights have been trained using biometric information representing at least one biometric feature of a person, receiving encrypted biometric information obtained by sampling at least one biometric feature of the person and encrypting the sampled biometric feature, obtaining an match-score using the encrypted trained neural network classifier, the match-score indicating a probability that the received encrypted biometric information matches the stored encrypted biometric information, and authenticating the person when the probability that received encrypted biometric information matches the stored encrypted biometric information exceeds a threshold.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide encrypted biometric information that can be stored and used for authentication with undegraded recognition performance. Embodiments may provide advantages over current techniques. For example, embodiments may provide security claims that can be measured against current cryptographic solutions, such as symmetric and asymmetric methods, since embodiments may be include known and accepted cryptographic modules. Further, the degradation in recognition performance rates can be described as a trade-off with memory and speed requirements, and for industry acceptable performance requirements embodiments may achieve both.

Leveraging advances in homomorphic encryption, embodiments may include a system that stores an encrypted user-specific classifier neural network per person. Biometric data that is sent to the server may be encrypted and may remain encrypted during the authentication process. Once the authentication process has ended, the server may have an encrypted match score. This score may only be decrypted by the user holding the private key, which then may be conveyed to the server through a specific protocol, by which the server can either authenticate or deny the user.

Figure 1:
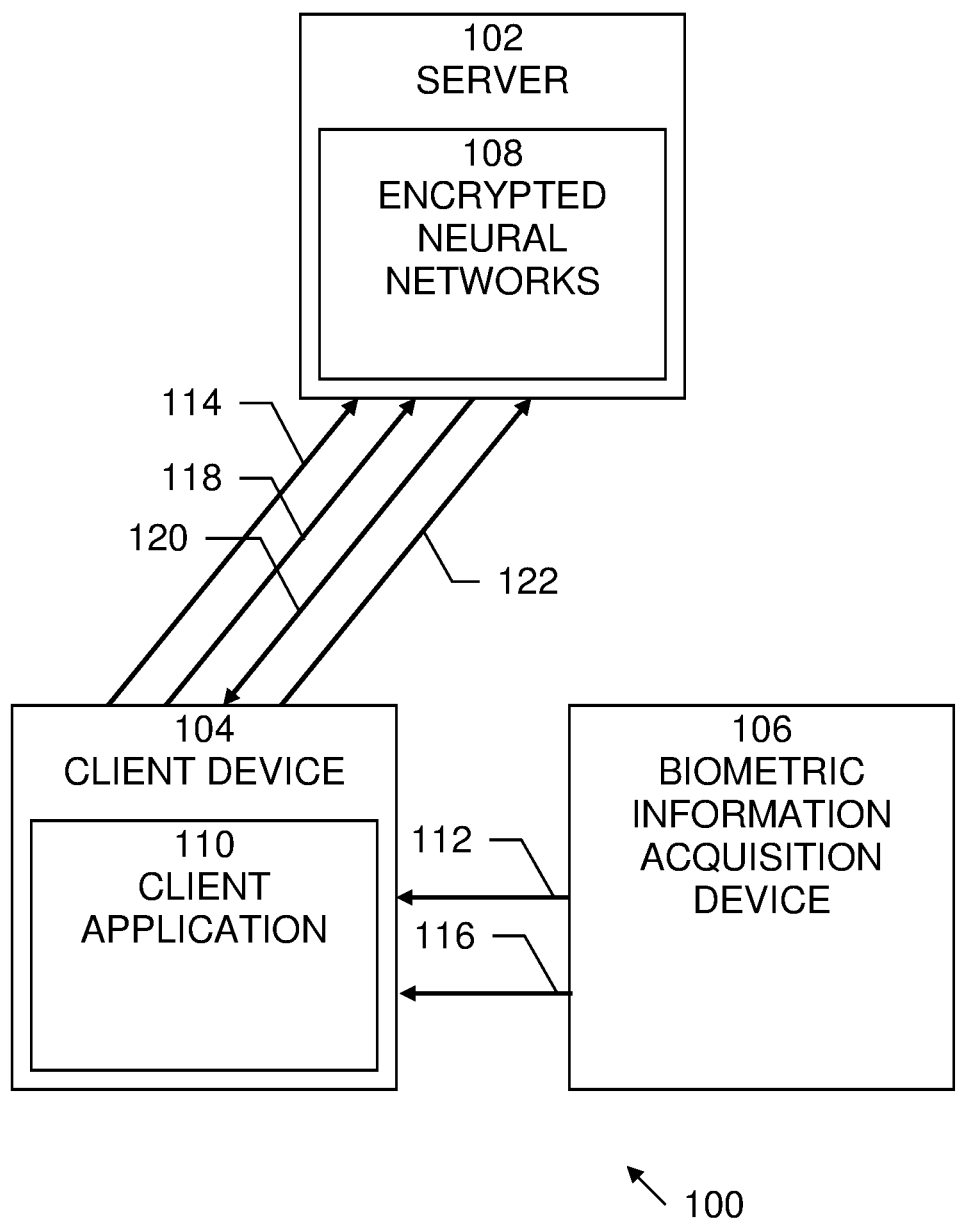
FIG. 1 illustrates an exemplary system in which the embodiments of the present systems and methods may be implemented.

An exemplary system 100 in which embodiments of the present systems and methods may be implemented is shown in FIG. 1. In this example, system 100 may include server 102, client device 104, and biometric information acquisition device 106. Server 102 may perform functions such as enrolling and authenticating users of the system, and may include a plurality of encrypted neural networks 108. Client device 104 may be any computing device capable of running software programs, and may include general purpose computing devices, such as a personal computer, laptop, smartphone, tablet computer, etc., and may include special-purpose computing devices, such as embedded processors, systems on a chip, etc., that may be include in standard or proprietary devices, such as entry devices, kiosks, ATMs, etc. Client device 104 may including and execute one or more client applications 110. Biometric information acquisition device 106 may be any device that may acquire biological, physiological, and/or physical biometric information, such as fingerprint, retinal scan, palm vein, face recognition, DNA, palm print, hand geometry, iris recognition, retina, and odor/scent, etc. Server 102 may be communicatively connected to client device 104 and biometric information acquisition device 106. Client device 104 may be communicatively and/or physically connected to biometric information acquisition device 106.

Figure 2:
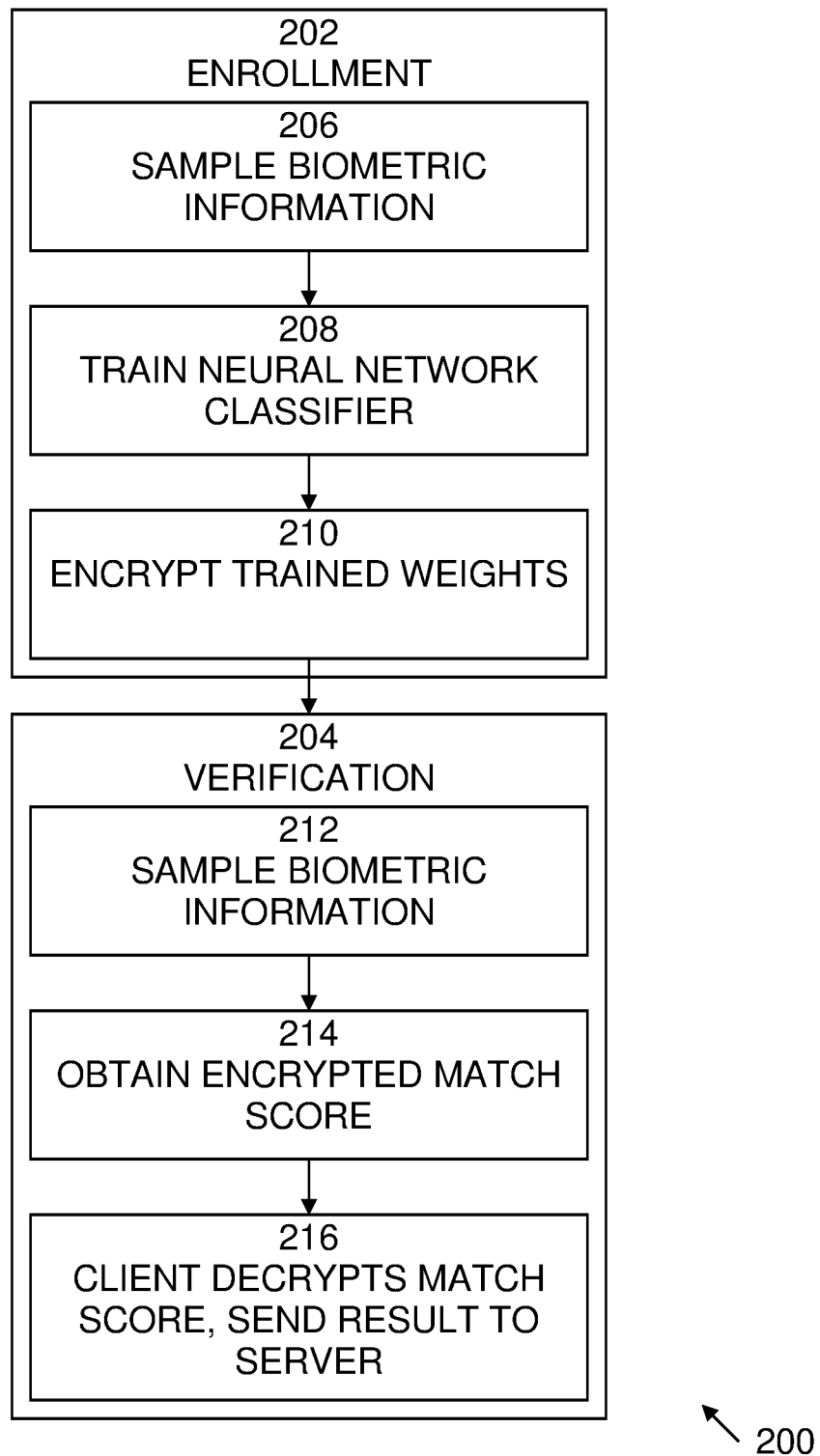
FIG. 2 is an exemplary flow diagram of a process, which may implement embodiments of the present methods, and which may be implemented in embodiments of the present systems.

An exemplary flow diagram of a process 200 of operation of system 100 is shown in FIG. 2. It is best viewed in conjunction with FIG. 1. In this example, process 200 may include two phases, enrollment phase 202 and verification phase 204. Enrollment phase 202 may begin with 206, in which biometric information acquisition device 106 may sample one or more biometric features of a person and convert the sample to biometric information that is transmitted 112 to client device 104. At client device 104, client application 110 may train 208 a neural network classifier to identify the person's biometric features using the biometric information. In embodiments, the neural network classifier, or a subset of the layers of the neural network classifier may be trained using publicly-available non-private biometric information, and other layers of the neural network classifier may be re-trained using private biometric information of a specific individual. For example, to reduce the memory and speed requirements, the whole Neural-Network model may be trained using publicly available biometric data (that doesn't have any privacy constraints). The weights of, for example, the first few layers may be fixed or store and then, during enrollment, the remaining layers may be retrained using private, person-specific, biometric data. Thus, for example, only the last few layers need be encrypted. During verification, the biometric features may be first fed to the not-encrypted NN layers, then they may be encrypted and sent to the encrypted model. The trained weights may be encrypted 210 using, for example, homomorphic encryption and transmitted 114 to server 102, which may store the encrypted neural network 108 for that person. Homomorphic encryption allows computation on encrypted data such that when the results of the computation on the encrypted data is decrypted, the results are the same as if the computation had been performed on the unencrypted or plaintext data.

Verification phase 204 may begin with 212, in which biometric features are again sampled and biometric information may be transmitted 116 to client device 104. Client device 110 may process the biometric information, encrypt the biometric information, and transmit 118 the encrypted biometric information to server 102. At 214, server 102 may use the encrypted weights and the received biometric information features to employ the neural network and obtain an encrypted match-score. Server 102 now needs to know whether this match-score passes a threshold or not. Since only client device 104 can decrypt the match score, a process 216 may be used by which client device 104 may decrypt the match score using a private key and convey this to the server in a trusted secure manner. In embodiments, the encrypted match score may be decrypted by the user holding a private key, using a zero-knowledge-proof. Likewise, it may be verified that the user, which may be untrusted, correctly decrypted the match-score using a zero-knowledge proof. Examples of such zero-knowledge proofs may include, but are not limited to, performing a multiplication without a later addition, using other general functions, f(secret_number$_j$), techniques such as Vickery auctions, etc. A Vickery or highest bidder auction is zero knowledge. For example, the second-highest bidder may be considered as the threshold and then as a zero knowledge proof, the given score is the highest bidder.

Figure 3:
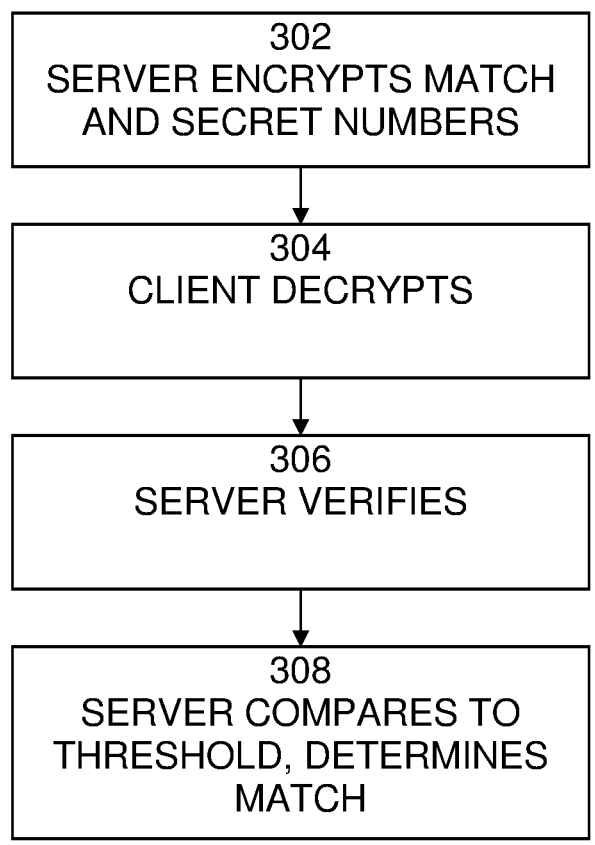
FIG. 3 is an exemplary flow diagram of a process, which may implement embodiments of the present methods, and which may be implemented in embodiments of the present systems.

An exemplary flow diagram of process 216 is shown in FIG. 3. It is best viewed in conjunction with FIG. 1. Process 216 may begin with 302, in which server 102 may multiply the encrypted match-score by an encrypted secret integer $R_1$. Server 102 may also encrypt N−1 other secret integers $R_2, \ldots, R_N$. Server 102 may transmit 120 the multiplied values including the multiplied encrypted match-score and the multiplied (encrypted) numbers to client device 104. The multiplied values may be transmitted 120 in a secret random order. Client device 104 may decrypt the multiplied values. Client device 104 may transmit 122 the decrypted valued back to server 102, which may verify the correctness of $R_2, \ldots, R_N$. For the remaining value, that value may be divided by $R_1$ to obtain the decrypted match score. Server 102 may then compare the decrypted match score against a threshold to determine whether there is a match. If there is a match, then the person may be authenticated.

Figure 4:
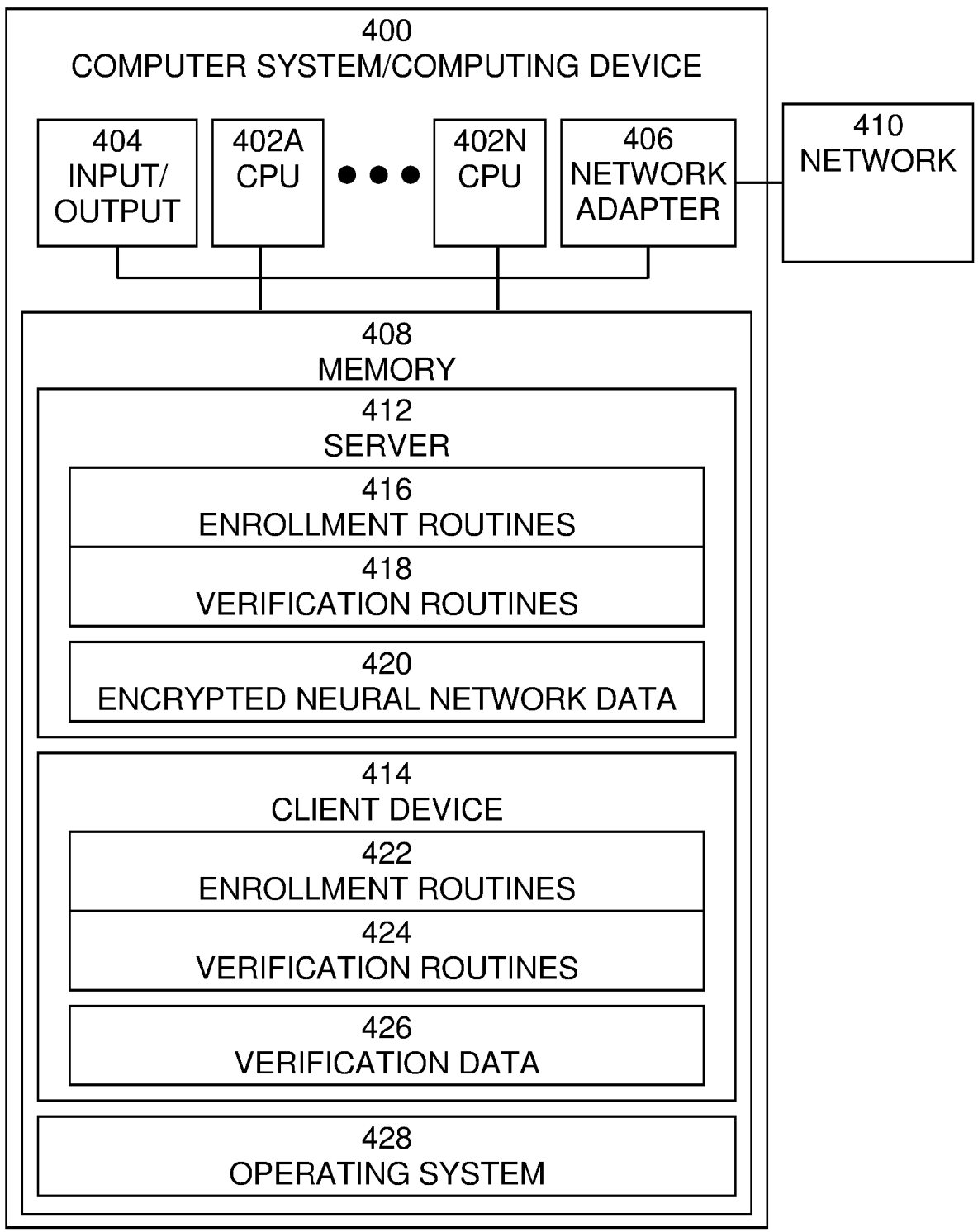
FIG. 4 is an exemplary block diagram of a computer system/computing device in which processes involved in the embodiments described herein may be implemented.

An exemplary block diagram of a computer system/computing device 402, in which processes involved in the embodiments described herein may be implemented, is shown in FIG. 4. Computer system/computing device 402 may be implemented using one or more programmed general-purpose computer systems, such as embedded processors, systems on a chip, personal computers, workstations, server systems, and minicomputers or mainframe computers, mobile devices, such as smartphones or tablets, or in distributed, networked computing environments. Computer system/computing device 402 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor or an ARM® processor. FIG. 4 illustrates an embodiment in which computer system/computing device 402 is implemented as a single multi-processor computer system/computing device, in which multiple processors 402A-402N share system resources, such as memory 408, input/output circuitry 404, and network adapter 406. However, the present communications systems and methods also include embodiments in which computer system/computing device 402 is implemented as a plurality of networked computer systems, which may be single-processor computer system/computing devices, multi-processor computer system/computing devices, or a mix thereof.

Input/output circuitry 404 provides the capability to input data to, or output data from, computer system/computing device 402. For example, input/output circuitry may include input devices, such as keyboards, mice, touchpads, trackballs, scanners, analog to digital converters, etc., output devices, such as video adapters, monitors, printers, biometric information acquisition devices, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system/computing device 402. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system/computing device 402 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 4, while for compactness memory 408 is shown as including memory contents for a server 412 and memory contents for a client device 414, typically computer system/computing device 400 only includes one such memory contents. In this example, server 412 may include enrollment routines 416, verification routines 418, and encrypted neural network data 420. Likewise, in this example, client device 414 may include enrollment routines 422, verification routines 424, and verification data 426. Enrollment routines 416 may include software routines to perform server enrollment processes, as described above. Verification routines 418 may include software routines to perform server verification processes, as described above. Encrypted neural network data 420 may include encrypted data representing trained neural networks, as described above. Enrollment routines 422 may include software routines to perform client device enrollment processes, as described above. Verification routines 424 may include software routines to perform client device verification processes, as described above. Verification data 426 may include encrypted and decrypted data used by the client device during the verification process, as described above. Operating system 428 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for biometric authentication, implemented in a computer comprising a processor, memory accessible by the processor, and computer program instructions stored in the memory and executable by the processor, the method comprising:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, transmitting the encrypted match-score to a client device, receiving an unencrypted match-score from the client device, determining that the client correctly decrypted the match-score using a zero-knowledge proof, and comparing the unencrypted match-score with the threshold; and authenticating the person when the probability that received encrypted biometric information matches the stored encrypted biometric information exceeds a threshold.

2. The method of claim 1, wherein the encrypted biometric information is received from a client device communicatively connected to a biometric information acquisition device.

3. The method of claim 2, wherein the decryption is performed at the client device using a private key.

4. The method of claim 1, wherein some of the layers of the neural network classifier were trained using publicly-available non-private biometric information, and some layers of the neural network classifier were re-trained using private biometric information of the person.

5. The system of claim 1, wherein the encrypted biometric information is received from a client device communicatively connected to a biometric information acquisition device.

6. The system of claim 5, wherein the decryption is performed at the client device using a private key.

7. A system for biometric authentication, the system comprising a processor, memory accessible by the processor, and computer program instructions stored in the memory and executable by the processor to perform:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, transmitting the encrypted match-score to a client device, receiving an unencrypted match-score from the client device, determining that the client correctly decrypted the match-score using a zero-knowledge proof, and comparing the unencrypted match-score with the threshold; and authenticating the person when the probability that received encrypted biometric information matches the stored encrypted biometric information exceeds a threshold.

8. The system of claim 7, wherein some of the layers of the neural network classifier were trained using publicly-available non-private biometric information, and some layers of the neural network classifier were re-trained using private biometric information of the person.

9. A computer program product for biometric authentication, the computer program product comprising a non-transitory computer readable storage having program instructions embodied therewith, the program instructions executable by a computer, to cause the computer to perform a method comprising:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, transmitting the encrypted match-score to a client device, receiving an unencrypted match-score from the client device, determining that the client correctly decrypted the match-score using a zero-knowledge proof, and comparing the unencrypted match-score with the threshold; and authenticating the person when the probability that received encrypted biometric information matches the stored encrypted biometric information exceeds a threshold.

10. The computer program product of claim 9, wherein the encrypted biometric information is received from a client device communicatively connected to a biometric information acquisition device.

11. The computer program product of claim 10, wherein the decryption is performed at the client device using a private key.

12. The computer program product of claim 9, wherein some of the layers of the neural network classifier were trained using publicly-available non-private biometric information, and some layers of the neural network classifier were re-trained using private biometric information of the person.

13. A method for biometric authentication, implemented in a computer comprising a processor, memory accessible by the processor, and computer program instructions stored in the memory and executable by the processor, the method comprising:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, multiplying the encrypted match-score by a first encrypted secret integer, encrypting a plurality of additional secret integers, transmitting the multiplied encrypted match-score and at least some of the plurality of encrypted additional secret integers to a client device, receiving a decrypted multiplied match-score and decrypted additional secret integers from the client device, verifying the correctness of the decrypted additional secret integers, and dividing the unencrypted match-score by the first encrypted secret integer to obtain the match-score; and authenticating the person when the probability that received encrypted biometric information matches the stored encrypted biometric information exceeds a threshold.

14. The method of claim 13, wherein the multiplied encrypted match-score the encrypted additional secret integers are transmitted to the client device in a secret random order.

15. A system for biometric authentication, the system comprising a processor, memory accessible by the processor, and computer program instructions stored in the memory and executable by the processor to perform:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, multiplying the encrypted match-score by a first encrypted secret integer, encrypting a plurality of additional secret integers, transmitting the multiplied encrypted match-score and at least some of the plurality of encrypted additional secret integers to a client device, receiving a decrypted multiplied match-score and decrypted additional secret integers from the client device, verifying the correctness of the decrypted additional secret integers, and dividing the unencrypted match-score by the first encrypted secret integer to obtain the match-score; and authenticating the person when the probability that received encrypted biometric information matches the stored encrypted biometric information exceeds a threshold.

16. The system of claim 15, wherein the multiplied encrypted match-score the encrypted additional secret integers are transmitted to the client device in a secret random order.

17. A computer program product for biometric authentication, the computer program product comprising a non-transitory computer readable storage having program instructions embodied therewith, the program instructions executable by a computer, to cause the computer to perform a method comprising:

storing a plurality of encrypted trained weights of a neural network classifier, wherein the weights have been trained using biometric information representing at least one biometric feature of a person, and wherein the trained weights are encrypted using homomorphic encryption, multi-party computation, or a combination of the two;

receiving encrypted biometric information obtained by sampling at least one biometric feature of the person and encrypting the sampled biometric feature;

obtaining an match-score using the encrypted trained neural network classifier, the match-score indicating a probability that the received encrypted biometric information matches the stored encrypted biometric information, wherein obtaining the match-score comprises obtaining an encrypted match-score using the encrypted trained neural network classifier, multiplying the encrypted match-score by a first encrypted secret integer, encrypting a plurality of additional secret integers, transmitting the multiplied encrypted match-score and at least some of the plurality of encrypted additional secret integers to a client device, receiving a decrypted multiplied match-score and decrypted additional secret integers from the client device, verifying the correctness of the decrypted additional secret integers, and dividing the unencrypted match-score by the first encrypted secret integer to obtain the match-score; and authenticating the person when the probability that received encrypted biometric information matches the stored encrypted biometric information exceeds a threshold.

18. The computer program product of claim 17, wherein the multiplied encrypted match-score the encrypted additional secret integers are transmitted to the client device in a secret random order.

* * * * *